Figure 1:
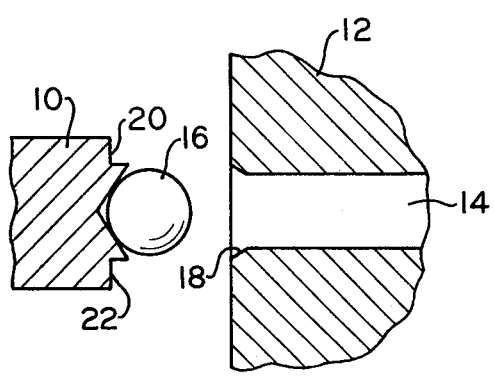

United States Patent [19]

Crossman et al.

[11] 3,952,395

[45] Apr. 27, 1976

[54] METHOD OF CLOSING THE END OF A DRILLED PASSAGE

[75] Inventors: Richard L. Crossman, Tallmadge; Harold E. Correll, Uniontown, both of Ohio

[73] Assignee: Goodyear Aerospace Corporation, Akron, Ohio

[22] Filed: Dec. 30, 1974

[21] Appl. No.: 537,070

[52] U.S. Cl. .............................. 29/401 C; 29/509; 29/520; 29/525; 138/89; 219/117 R; 220/359; 220/362; 228/135
[51] Int. Cl.² ...................... B22D 19/10; B23P 7/00
[58] Field of Search ............. 29/520, 509, 525, 515, 29/401 R, 470.5, 401 C, 401 D; 138/89; 220/234, 233, 309, 359, 362; 219/117 R; 228/135

[56] References Cited
UNITED STATES PATENTS

| 1,928,443 | 9/1933 | Archer et al. | 29/520 X |
|---|---|---|---|
| 2,138,404 | 11/1938 | Haas | 29/520 X |
| 2,506,765 | 5/1950 | Bach | 29/525 X |
| 3,059,627 | 10/1962 | Dadd | 29/525 X |
| 3,243,073 | 3/1966 | Gibson | 220/359 |
| 3,350,768 | 11/1967 | Meylan et al. | 29/525 X |
| 3,762,778 | 10/1973 | Boggs et al. | 220/233 X |
| 3,825,146 | 7/1974 | Hirmann | 220/234 |

*Primary Examiner*—Charlie T. Moon
*Attorney, Agent, or Firm*—F. W. Brunner; P. E. Milliken; E. W. Oldham

[57] ABSTRACT

The invention is designed to produce a more economical means of closing drilled passage holes in hydraulic and/or pneumatic systems either during manufacture and/or repair. The process involves pressing a ball, or diametral portion thereof, with a diametral interference fit, and of similar material as the parent part to be sealed, into the drilled hole causing a seal of the hole by relying on the curvature of the surface of the ball or plug to plastically deform and maintain a depressional diametral seal within the elastic limits of the seal and the parent material for sealing, and then crimping the parent material to be sealed over the end of the ball or plug to maintain it in position against pressure blow out. Alternate methods of holding the ball in position might include a line spot fusing utilizing a current passing through the ball to make the bond permanent, or a ring furnace fusing and/or other such fusing and partial staking procedures to bond the ball in place as an integral part of the unit.

6 Claims, 3 Drawing Figures

U.S. Patent    April 27, 1976                 3,952,395

PREPARE HOLE WITH EDGE TO AN O.D. EQUAL TO BALL DIAMETER 18, OR HOLE DIAMETER 14 EQUAL TO BALL DIAMETER MINUS REASONABLE PRESS FIT DIAMETERS AND INTERFERENCE

PRESS BALL INTO PLACE AND STAKE SIMULTANEOUSLY USING STAKING TOOL WITH WORKING DIAMETER 5% TO 15% LARGER THAN BALL DIAMETER

METHOD OF CLOSING THE END OF A DRILLED PASSAGE

PRIOR ART

It is known and understood that there have been many and various methods of plugging holes in plates or drilled passages. Typical patents related to this process that have been known in the past comprise U.S. Pat. No. 2,010,569 to Stitzler, wherein a plug 3 has a cylindrical body portion 4 and a centrally depending projection 5 concentric with the body portion. The projection 5 gradually increases in diameter from its upper end toward its lower end and preferably terminates in a cylindrical base 6 of a diameter such that it will fit snugly within the hole 2 of the steam platen 1. In this instance after the parts have been assembled the plug 3 is driven home within the platen 1 wherein the plug 3 drives against the sharply pointed shoulder 8 forcing the metal of the shoulder into intimate locking engagement with the conical plug projection 5 so that when the top surface of the plug is flush with the edge of the steam platen 1 the shoulder 8 is distorted to the shape represented in FIG. 3 to thereby hold the plug in position. A perspective view of the plug is shown in FIG. 4. The problem with this plug and method associated with it is that the plug itself requires considerable machining and thus expense to manufacture, and the seal is thus achieved by the flow of metal along the conical portion 5 when the plug is forced into the position shown in FIG. 3.

Alternative embodiments utilize soft metal rings 10 and 11 to again achieve the seal with respect to the tapered portion 5 of the plug 3 when the plug is pressed into position. Hence the sealing has to be achieved by the metal flow occurring during the final punch to not only seal but also to hold the plug into the bore. It is very difficult to obtain a consistently good seal based on the flow of metal occasioned with a substantially cylindrical or tapered object, and thermal differential expansion due to dissimular materials of plug, ring, and/or hole.

U.S. Pat. No. 3,522,648 teaches the use of a ductile slug 16 which is hit from both ends within a bore to effect an axial compression and radial expansion against the walls to achieve a seal. This obviously requires pressure from both ends and attempts to form a seal along a large surface of the cylindrical slug.

U.S. Pat. No. 2,944,326 teaches a method of staking blades to carrier, such as a rotor or the like, in the case of a turbine. The staking operation involves a staking die 26 which causes a metal ring 20 to flow into grooves 19 in the blade, as best seen in FIG. 6. This staking procedure is not to obtain a seal, but rather simply to obtain a fixed positioning of the blades to the rotor, without welding, use of fixing or anchoring screws, or the like. The inventor also says that it is a low cost method.

The general object of the present invention is to avoid and overcome the objections and deficiencies to such prior art practices by utilizing the inexpensive approach of staking, primarily with the highly precise sealing achieved by a ball in a hole to achieve a very low cost yet highly efficient sealing system. The ball achieves the seal when it is press-fit into position, and the staking merely holds the ball into such press-fit position in sealing relationship. The staking does not accomplish the seal in and of itself.

A further object of the invention is to provide a low cost highly efficient way to seal up holes to withstand very high amounts of pressure, and which utilizes high precision, readily available cylindrical balls for the sealing operation by providing the balls at a slightly larger diameter than the diameter of the hole, but falling within the reasonable press-fit criteria relationships.

A further object of the invention is to provide a method for sealing holes which is low cost because no special machining operations are required, and which is extremely easy to accomplish utilizing only a hammer and a simple, special staking tool to operate in conjunction with the sealing ball.

A further object of the invention is to provide a simple and inexpensive way to seal holes in which the hole to be sealed should be in a ductile material, but where the sealing ball preferably has an equal or slightly greater degree of hardness than the material.

The aforesaid objects of the invention and other objects which will become apparent as the description proceeds are achieved in a process for sealing drilled passage holes in a ductile material which includes the steps of selecting a spherical ball to a diameter greater than the diameter of the hole by the maximum reasonable press-fit diameters and interference, preparing the hole with a tapered edge on the surface of the material, to an outer diameter equal to the diameter of the ball, pressing the ball into position to about a flush relationship with the outer face of the work, and staking the ball in such pressed position by crimping the material of the work over the ball to a diameter less than the diameter of the ball.

Figure 2:
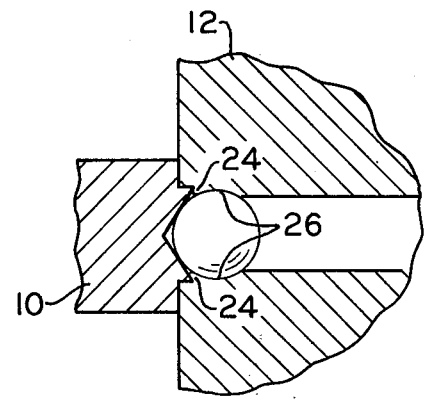
Figure 3:

For a better understanding of the invention reference should be made to the drawings wherein FIG. 1 is a broken-away, schematic illustration showing the ball, the relationship of the hole to the work, and the tool arranged in spaced relationship prior to the ball being pressed into the hole;

FIG. 2 is a broken-away, schematic illustration of the tool having pressed the ball into position in the hole and staked the metal over the ball to hold it in position; and FIG. 3 is a block diagram illustrating the steps needed to perform the process of the invention.

It should therefore be understood that the invention is designed to produce a more economical means of closing drilled passage holes in hydraulic and/or pneumatic systems either during manufacture and/or repair.

With reference to FIGS. 1 and 2 of the drawings, the preferred embodiment of the invention is seen to incorporate a crimping tool indicated generally by numeral 10, a work piece indicated by numeral 12, having a hole 14. A ball indicated by numeral 16 is what is used to close the hole 14 in the work piece 12. FIG. 1 illustrates these in a spreadapart relationship, but illustrates that the hole 14 is of a diameter less than the ball 16, with this difference being equal to reasonable standard press-fit diameters and interference relationship. In order to at least allow the ball to start into the hole, and to facilitate the press-fit, the hole is provided with a tapered opening at 18, which is tapered to an outer diameter equal to the diameter of the ball 16, and preferably is at an included angle between 0° to 30° with respect to the hole, although it has been determined that perhaps an included angle of about 18° appears to be best using standard burring tooling.

The ball 16 is of the same material as the work and standard ball bearing by the Excelsior Ball, Inc. Company, for example, and which balls are of high precision in terms of their spherical shape, and very close diametral tolerance. The ball 16 is preferably of slightly harder material than the work 12, and in fact the work 12 must be somewhat ductile so as to receive the ball 16 in the press-fit relationship without cracking as is true with non-ductile materials.

FIG. 2 then illustrates the pressing of the ball 16 into position with the tool 10 whereby the tool 10 has a shoulder 20 to limit its penetration with respect to the work piece 12, and the ball 16 is nestled into the conically shaped staking head 22 of the tool 10, which is illustrated in cross-section in FIGS. 1 and 2. The actual diameter of the staking head 22 is preferably between 5 to 15 percent larger than the diameter of the ball, and the angle of the taper of the staking head seems to work best at about 120° to 125° included angle (125° for ¼ inch balls, and 120° for larger 5/16 inch through ⅜ inch balls) so that the total depth from shoulder 20 to the end of the staking head is such that when the shoulder 20 hits flush up against the work piece 12 the ball 16 will be pressed into the hole 14 so that it is now substantially flush to the surface of the work piece 12. I have found that, utilizing a 0.250 inch ball for a 0.228 to 0.242 inch passage, the diameter of the tool should be between 0.030 to 0.040 inches greater than the 0.250 inch ball diameter, while for a 5/16 inch ball to ⅜ inch ball diameter, the diameter of the staking head 20 should be about 0.050 inches (for a 5/16 inch ball) to 0.070 inches (for a ⅜ inch ball). The length of the staking head 22 as stated above is the minimum necessary to ensure that the ball is flush to a 1 percent to 20 percent diameter below the outer face of the work.

It is thus apparent with respect to FIG. 2 that when the ball 16 is pressed into position as shown in FIG. 2 that the edge of the staking head 22 will pick up the metal from the outside of the hole around the taper 18 and force it out over the ball 16 as illustrated at numeral 24 in FIG. 2, thus properly holding the ball into fixed position within the hole 14. It can be seen that the ball 16 actually causes an elastic deformation of the material 12 as indicated at numeral 26 because of the press-fit relationship.

I have found that utilizing this procedure I have tested the process successfully, with no indication of failure, utilizing the tolerances and dimensions indicated herebelow:

| 1/4 inch ball | 17,000 PSI |
| 5/16 inch ball | to 13,000 PSI |
| 3/8 inch ball | to 11,000 PSI |

Hence, the steps of the invention are illustrated in FIG. 3 of the drawings which, with respect to the work piece, require preparation of the hole with an edge to an outer diameter equal to the diameter of the ball by providing a tapered recess to a diameter equal to reasonable press-fit diameters and interference. Once this is accomplished then the ball may be pressed into position to about a flush relationship with the outer face of the work, and simultaneously a crimping or staking or plugging operation is then provided with a diameter between 10 to 25 percent larger than the ball diameter to then crimp the metal of the work over the exposed portion of the ball, at least a distance equal to about between 5 and 25 percent of the diameter of the ball.

Thus it is seen that by pressing a ball, or diametral portion thereof, with a diametral interference fit, into the drilled hole will cause a seal of the hole. This technique in effect relies on the curvature of the surface of the ball or plug to form an elastic seal contact with the walls of the hole, as best seen in FIG. 2 of the drawings. The contact achieves an extremely good seal as illustrated by the fact that extremely high pressures have been held utilizing this process (as indicated above). The technique for holding the ball into position then with this seal can involve the staking operation described above, or might utilize a current being passed through the ball and thence into the work piece 12 to effect a line spot fusing, thus making the bond permanent. Alternate fusing methods may include ring furnace brazing and/or other such fusing procedures to bond the ball in place as an integral part of the unit in contrast to the staking operation.

Hence, it should be understood that the invention utilizes a low cost, high precision ball press-fit within reasonable press-fit standards into the hole to achieve a plugging thereof, and which plugging provides a seal even against very high pressure conditions, and that then the ball is held in place, but not actually sealed by the staking operation which simply holds the ball in position where it has been press-fit to achieve the seal. Other techniques for holding the ball in position would include any suitable welding or brazing.

While in accordance with the patent statutes only the preferred embodiment of the invention has been illustrated and described in detail, it is to be particularly understood that the invention is not limited thereto or thereby, but that the inventive scope is defined in the appended claims.

The embodiments of the invention in which an exclusive property or privilege is claimed are defined as follows:

1. A method for plugging holes in a work piece utilizing a spherical ball which includes the steps of:
   1. preparing the work piece from a ductile metallic material,
   2. preparing a uniform diameter to the hole in the work piece with an outward taper at the end thereof to the surface of the work piece thereby defining a larger diameter at the surface equal to the outer diameter of the ball to initially receive and align the ball with the hole,
   3. preparing the ball from the same metallic material as the work piece,
   4. pressing the ball into the hole to define a continuous line contact with the inner surface of the hole so that it is about flush to the outer face of the work piece, and
   5. holding the ball into such press-fit relationship with the hole.

2. A process according to claim 1 where the ball is prepared to have a slightly harder surface than the work piece.

3. A process according to claim 1 which includes providing the relationship between the ball and the hole so that the ball is of a diameter larger than the hole equal to reasonable standard press-fit diameters and interference.

4. a process according to claim 3 where the holding is accomplished by utilizing a crimping tool between 10 to 25 percent larger than the ball diameter to crimp the metal of the work over a portion of the exposed surface of the ball.

5. A process according to claim 3 which includes passing electric current through the ball and the metal to achieve line spot fusing to hold the ball with respect to the work in the hole.

6. A process according to claim 3 which includes ring furnace brazing the ball with respect to the work so as to hold the ball in the hole.

\* \* \* \* \*